United States Patent [19]

Tsau

[11] Patent Number: 5,388,772

[45] Date of Patent: Feb. 14, 1995

[54] METHOD TO HOMOGENEOUSLY MIX LIQUIDS WITH POWDERS

[76] Inventor: Josef H. Tsau, 15358 W. Fair La., Libertyville, Ill. 60048

[21] Appl. No.: 159,327

[22] Filed: Nov. 30, 1993

Related U.S. Application Data

[63] Continuation-in-part of Ser. No. 103,704, Aug. 9, 1993.

[51] Int. Cl.⁶ ............................................. B02C 23/36
[52] U.S. Cl. ........................................ 241/17; 241/22; 366/147
[58] Field of Search ...................... 241/15, 16, 17, 21, 241/22, 23, 27, 30, 65; 366/4, 7, 147, 148

[56] References Cited

U.S. PATENT DOCUMENTS

| 2,595,631 | 5/1952 | Bertsch | 366/7 |
| 3,712,593 | 1/1973 | Szatmari | 366/7 |
| 5,100,239 | 3/1992 | Ono et al. | 366/7 |
| 5,104,232 | 4/1992 | Lennox, III | 366/147 X |

*Primary Examiner*—Timothy V. Eley
*Attorney, Agent, or Firm*—Welsh & Katz, Ltd.

[57] ABSTRACT

Mixing frozen liquid particles with powder instead of spraying liquid on powder in a mechanical mixer results in improving mixing homogeneity, reducing processing time, and simplifying mixing equipment and method.

8 Claims, No Drawings

METHOD TO HOMOGENEOUSLY MIX LIQUIDS WITH POWDERS

This application is a continuation-in-part of U.S. application Ser. No. 08/103,704 filed on Aug. 9, 1993.

INTRODUCTION

Granulation technology has been extensively utilized to reduce dust, improve flow character, increase or reduce dissolution rate, reduce interactions among ingredients, and change bulk density by various industries including pharmaceutical, food, and agriculture industries. One of the most broadly utilized granulation methods is mechanical mixing granulation which granulate powders in a mechanical mixer using a binder solution or solvent. This popular method still has the following major drawbacks and limitations.

1. This method produces a broad range of granular particle sizes which means low yield for obtaining a desired narrow range particle size product.

2. This method requires long granulation time since slow addition of binder liquid is required to achieve homogeneous granulation.

3. Many highly soluble and sticky wet powder materials can not be granulated to a desired size range particles by this method since it can not prevent extensive agglomeration to occur.

The highly soluble and sticky powder materials may be granulated in a fluid-bed granulator, which, however, only makes fluffy and fragile types of granules. A mechanical mixing granulation method, meanwhile, produces denser and harder granules than a fluid-bed granulation method. In other words, these two granulation methods are different in their applications.

Some physical properties, such as melting and glass transition points, of many powder materials can be significantly modified by changing the content of their residual solvent, such as water. Quantitative adjusting powder materials' residue liquid levels, therefore, has potential applications. It is, however, technically very difficult to homogeneously add a trace quantity of liquids, even to powder materials.

Many drugs, food additives, sweeteners, etc, have very high potencies. They often need to be greatly diluted, e.g., more than one hundred folds to make consumer products. Products of this type are made either with very expensive mixing methods, such as multiple step mixing and fluid-bed granulation, or having poor content uniformity.

Many solutions are too viscous to be pumped and sprayed. They are not usable by current liquid addition methods to mix with or to granulate powders.

There is, therefore, a need of improvement of the mixing homogeneity of mechanical mixing and granulation methods which add liquids to powders and a need of a method to mix viscous liquids with powders.

SUMMARY OF THE INVENTION

The invention relates to an uniquely effective and simple method to quickly and homogeneously wet and granulate powders with liquids in a mechanical mixer. Instead of adding liquid to powder directly, the inventive method adds granular or powder frozen liquid, to mix with and to granulate powders in a mechanical mixer. This frozen liquid addition method significantly reduces the processing time and improves the homogeneity of powder-liquid mixing and granulation. It also extends the application to homogenously mix liquid with highly soluble powders in a mechanical mixer, since direct adding liquid to such powders immediately forms aggromerates. It is also for mixing viscous liquids with powders in a mechanical mixer.

DETAILED DESCRIPTION OF THE INVENTION

The invention relates to a method to achieve high homogeneity of mixing of liquids with powders in a mechanical mixer. The addition of a liquid to a powder in a mechanical mixer often has the following problems:

1. Liquid is added to only a small portion of the powder particles close to one another at any time resulting in uneven mixing.

2. Liquid addition is often aided by pressurized air to atomize liquid particles. This addition method is dusty.

3. It results in granular products having broad particle size range due to uneven mixing.

4. Long liquid addition time is needed to achieve a desired mixing homogeneity.

5. It is difficult to mix liquid with highly soluble powder materials which instantly aggromerate by the liquid.

6. It is difficult to add viscous liquid to and disperse it in powders.

All high shear energy granulators, which are mechanical mixers having essentially optimized mixing efficiency, still have problems to homogeneously mix some liquids and powders. Mechanical mixers have one or more inlets to add liquid to powder while mixing. The liquid is added by pumping in through the inlets, which often equipped with spraying nozzles. This type of liquid addition methods can only add liquids to a small portion of mechanically fluidized powders at any time, resulting in uneven addition and mixing of liquid and powder. The invention relates to a surprisingly simple and economical liquid addition method to have improved mixing homogeneity. Instead of adding liquid, which dissolves and aggromerates some powder particles instantaneously upon contact, the inventive method adds frozen powder or granular particles of liquids. The required amount of frozen liquid particles can be added all at once to the powder in the granulator right before starting to mix and to granulate. They can also be added through a insulated feeder to the powder in a mixer during mixing. In any case, there is sufficient time for the frozen particles to be mixed with the whole powder before they begin to melt to release liquid. During mixing the liquid in the frozen particles, which are already evenly distributed in the powder, are released in a sustained fashion to achieve a homogeneous mixing level the liquid spraying addition methods can not match.

Either a binder solvent or a solution is used to granulate powder particles. When a powder is soluble or partially soluble, a solvent can be used to granulate it. When a powder is not soluble and its wetted powder is not sticky, a binder solution is needed to granulate it. For adding a solvent to slow dissolving powders, there is a time delay for binding effect to fully develop. For granulating very slow dissolving powders, solvent can be added by simply pumping it onto part of the powder and the mixing action of the granulator can homogeneously mix the liquid with the entire powder resulting in forming uniform granular particles. In most cases, however, the binding effects start as soon as the liquid binder contacts the powder particles and the binder liquid needs to be sprayed in while mixing. The uniformity of granulation depends, partially, on how fine the binder liquid spraying particles are atomized. Since the binder liquid is added to only a small portion of the powder at a time, only this wetted powder portion forms granules. If the liquid is added too fast, this wetted portion of powder will form undesirably large granular particles. It is necessary, therefore, to add binder liquid slowly, for obtaining up more uniform granular particle sizes. Often, compromise is needed between having a reasonably short processing time and obtaining a less than desired broad range of granular particle size. When the powder is highly soluble to form sticky liquid, even a very slow liquid addition or time consuming granulation process can not avoid failures, e.g., from extensive agglomeration. Another common technical problem of mechanical mixing and liquid addition granulation methods is that the fluidized powder particles often quickly block the liquid spraying nozzles making it very difficult to continuously spray fine binder liquid particles to achieve uniform granulation.

The above discussed problems are as old as the granulation methods. It is, therefore, surprising that a simple and economical method exists to solve them. The frozen binder liquid powder can be kept at a temperature significantly below melting point so that it will not begin to melt right away when it is added directly to a powder in a granulator before mixing starts. It will not start to melt for a brief moment, which is long enough to allow it to be mixed evenly with the entire powder. It then begins to melt at an accelerated rate by the mixing action. Still, it takes some time to melt the frozen liquid particles during mixing and granulating allowing very uniform wetting of the powder and granulation. A preferred method, however, is to add a frozen liquid particles into the granulator which has already been loaded with the dry powder, while mixing, through an insulated feeder. A preferred continuous granulation method is to pre-mix a frozen liquid particles with a powder in a batch mechanical mixer to achieve complete melting of frozen liquid particles resulting in even mixing of liquid and powder then feed the mixture into a continuous mechanical mixing granulator to granulate.

Since mechanical mixers and a relatively large quantity of powder usually have large enough heat capacity, with the aid of mixing action frozen liquid particles, after evenly distributed in a powder, should melt quickly. Besides, mechanical mixers are often equipped with temperature control devices, such as jacketed water or steam, which can accelerate frozen liquids' melting rate and control mixing and granulation temperature. In other words, a frozen liquid powder mixing process can achieve more uniform mixing and granulation level with significantly shorter processing time than a liquid spraying mixing process. The frozen liquid adding process also can uniformly mix a very small amount of liquid with a large amount of a highly soluble or sticky powder, such as Maltodextrins, polydextrose, food gums, sweeteners, flavors, etc., or to evenly granulate them. Upon frozen, highly viscous liquids lose their difficult to handle sticky properties and can be easily ground and used like other frozen liquids to evenly mix with and to granulate powders by the inventive method.

Any liquid can be frozen and ground before adding to a powder. Water and water solutions of solids, liquids, and gases are, however, the most useful and practical frozen liquids of this invention. Pure alcohols, such as methanol, ethanol, and propyl alcohols have very low freezing points and, therefore, have little practical application values. Some alcohol water mixtures do, however, have acceptably high freezing point and some applications for dissolving water-insoluble binders such as zein. Only solid binders are practically useful for granulation applications. They can be dissolved in water or water-alcohol mixtures to form binder liquids. Besides, this invention can utilize very thick, such as cream-like and paste-like, binder liquids, such as food gum solutions, since they can be frozen and ground into easy to handle frozen particles, to granulate powder compositions. Both fine and large frozen binder liquid particles can be used. The large frozen binder liquid particles are further broken down by the intense mixing of the granulator. Even when the large frozen particles stay intact during mixing, since they release binder liquid slowly, they also result in homogeneous mixing with entire powder.

One specific application of this invention is to make a quantitative and homogeneous addition of a trace amount of a liquid, such as water to a powder material, such as polydextrose to modify its physical properties. A similar application is to make a huge dilution of a potent ingredient, such as an intense sweetener, drug, or flavoring agent, in liquid or concentrate solution form, by a bulking agent such as maltodextrins, sugars, sugar alcohols, starches, and modified starches. Such applications often require only homogeneous mixing of a powder with a very small quantity of liquid, without changing its powder's form.

Mechanical mixing granulator can be a variable speed mixer which perform mixing at lower speed and granulating at higher speed. It may have two types of mixing devices, such as a set of large plow mixers and a set of choppers, such as the Mixmill of Processall. The large plow mixers can perform effective mixing function and the choppers are more effective for granulation. There are mechanical mixers whose container also rotates to enhance mixing and granulation actions, such as the Mix Pelletizer of Eirich Machine. There are continuous mechanical mixing granulators having both powder and liquid inlets at one end and an outlet at the other end. The powder and the liquid are mixed and/or granulated continuously in its intense mixing chamber, which contains fast rotating bars or pins, such as the Turbulizer of Bepex. Since the residence time in such a continuous granulation equipment is very short, a pre-mixing step to mix powder with frozen liquid particles at a proper ratio predetermined experimentally is helpful to allow time to melt the frozen liquid particles. Granulation is achieved by mixing a powder with its binder liquid. Often, granulation only occurs at very high speed mixing. It is often desirable to mix a powder and its frozen binder liquid particles at a below granulation speed to obtain a homogeneous powder mix and then increase mixing speed to achieve homogeneous granulation. The drying equipment used by conventional mechanical mixing granulation methods, such as tray dryer, fluid-bed dryer, and turbo-dryer, can be used.

The frozen liquid mixing method of this invention eliminates the need of a liquid delivery system, such as spraying nozzle with pressurized air atomizing system and its associated problems, such as dust, expenses, and time consuming. The invention, therefore, significantly simplifies the methods of mechanical mixing of liquids with powders and the granulation of powders by liquids and reduces equipment cost.

The frozen liquid and powder mixing method of this invention requires an equipment to make desired particle size range granular and/or powder particles of frozen liquid and store them at desired temperature ready for utilization. An automatic ice making freezer equipped with a ice milling machine and a temperature adjustable storage compartment can serve the basic need of this invention. The technologies for making such an equipment is well established but such a need has not been identified. A preferred equipment, however, can make narrow particle size distribution spheronized fine granular frozen liquid particles, which optimize both their evenness of distribution in powder and sustained-release action of liquid resulting in optimized homogeneity of mixing with powder. Fine spheronized frozen liquid particles can be made by frozen fine water droplets pushing out of fine needle holes. They can also be made by freezing fine water particles sprayed into a freezing chamber similar to the spray-congealing method for making spherical granular fat particles.

The following examples further demonstrate the skill but not to limit the spirit and the scope of the invention.

EXAMPLE 1.

A Presto MinnieMax compact Food Processor is utilized to serve as a (vertical) high shear energy granulator, since it performs essentially the same intense mixing function as a intense mixing granulator.

The ice cubs in a double layered plastic bag is powdered by a hammer and stored in a freezer before use.

The powdery contents of 20 Wyler's unsweetened Orange soft drink mix packets are emptied into the food processor. A very small amount of ice powder is sprinkled in. The food processor is quickly covered and started mixing for about 1 minute. A uniform size fine granules, ~80-120 mesh, is obtained. Then, about the same amount of ice powder was added again and mixed for another minute. A uniform size, ~40-60 mesh, spherical granular particles are obtained. They tend to stick together and should be immediately dried in a fluid-bed drier. The powder drink mixes are highly soluble and sticky powders which can not be properly granulated by a conventional mechanical mixing granulation method which directly adds binder liquid to granulate.

EXAMPLE 2.

Corn starch powder is widely used in cooking to add thickness to the soup of cooked dishes. It is powdery to use and needs to be dispersed in water before use. Otherwise, large starch lumps can form in cooked dishes. There is, therefore, a need for instantly dispersible fine granular starch product. Corn starch is insoluble and non-sticky and, therefore, needs a granulation binder. The gelatinized (cooked) corn starch is paste-like but can serve as a granulation binder of this inventive method.

A teaspoonful corn starch is dispersed in about 150 ml water and cooked in a microwave oven to form a soft paste. It is frozen in a freezer, crushed by a hammer, and kept in freezer before use. The same compact food processor of EXAMPLE 1 is used.

About 200 g of corn starch powder is added into the food processor. Some frozen powder of gelatinized corn starch paste is added and immediately started to mix for about 1 minute. After 3 additions and mixings, very fine spherical granules are formed. After 4 additions and mixings, a desired fine granular product having about 60-100 mesh size range is obtained. It was dried in an oven. It can be used in a shaker to sprinkle in foods while cooking without dusting and forming lumps.

What is claimed is:

1. A simplified mechanical mixing method for adding an amount of liquid to a powder selected from the group consisting of polydextrose, maltodextrin, sugar, sugar alcohol, starch and modified starch for improved homogeneity of mixing and reduced processing time comprising the step of mixing frozen particles of said liquid with said powder in a mechanical mixer to melt said frozen particles to form an uniformly wetted powder product.

2. The mechanical mixing method of claim 1 comprising the steps of:
   a. adding dry powder to a mechanical mixer;
   b. adding frozen liquid particles on top of the powder;
   c. immediately starting mixing, until all frozen particles are melted, to obtain a homogeneously wetted product.

3. The mechanical mixing method of claim 1 comprising the steps of:
   a. adding dry powder to a mechanical mixer;
   b. starting mixing;
   c. adding all frozen liquid particles through an insulated feeder while mixing;
   d. continuing mixing to melt all frozen particles to obtain a homogeneously mixed product.

4. The mechanical mixing method of claim 1 wherein said mechanical mixer is selected from the group consisting of a high shear energy granulator, a mechanical mixer equipped with choppers, a mix pelletizer (or) and a continuous mixer.

5. The mechanical mixing method of claim 1 wherein said frozen liquid is selected from the group consisting of ice, frozen water solution and frozen water alcohol solution of an intense sweetener, a high potency drug, a flavoring agent, a fertilizer, or a pesticide.

6. The mechanical mixing method of claim 1 wherein said frozen liquid particles are made with (a) an automatic ice making freezer equipped with an ice milling machine and a temperature adjustable storage compartment.

7. The mechanical mixing method of claim 1 wherein said frozen liquid particles have a spherical shape made by freezing fine liquid droplets dropping out of fine needle holes.

8. The mechanical mixing method of claim 1 wherein said frozen liquid particles have a spherical shape made by freezing fine liquid droplets spraying into the freezing chamber of a freezer.

* * * * *